US011756201B2

(12) United States Patent
Geurts et al.

(10) Patent No.: US 11,756,201 B2
(45) Date of Patent: Sep. 12, 2023

(54) METHOD AND SYSTEM FOR PERFORMING CHARACTERIZATION OF ONE OR MORE MATERIALS

(71) Applicant: VITO NV, Mol (BE)

(72) Inventors: Roeland Geurts, Mol (BE); Kris Broos, Mol (BE); Mieke Quaghebeur, Mol (BE)

(73) Assignee: VITO NV, Mol (BE)

( * ) Notice: Subject to any disclaimer, the term of this patent is extended or adjusted under 35 U.S.C. 154(b) by 154 days.

(21) Appl. No.: 17/345,388

(22) PCT Filed: Dec. 18, 2020

(86) PCT No.: PCT/EP2020/087063
§ 371 (c)(1),
(2) Date: Jun. 11, 2021

(87) PCT Pub. No.: WO2021/123197
PCT Pub. Date: Jun. 24, 2021

(65) Prior Publication Data
US 2022/0215554 A1  Jul. 7, 2022

(30) Foreign Application Priority Data

Dec. 18, 2019  (EP) .................................... 19217631

(51) Int. Cl.
*G06T 7/10* (2017.01)
*G06T 7/62* (2017.01)
(Continued)

(52) U.S. Cl.
CPC .................. *G06T 7/10* (2017.01); *G06T 7/62* (2017.01); *G06V 10/774* (2022.01); *G06V 10/82* (2022.01);
(Continued)

(58) Field of Classification Search
CPC . G06T 2207/20081; G06T 2207/30148; G06T 2207/10116; G06T 7/0004;
(Continued)

(56) References Cited

U.S. PATENT DOCUMENTS

| 978,585 A | 12/1910 | Huber |
| 2008/0029445 A1 | 2/2008 | Russcher et al. |

(Continued)

FOREIGN PATENT DOCUMENTS

| CH | 683674 A5 | 4/1994 |
| CH | 685807 A5 | 10/1995 |

(Continued)

OTHER PUBLICATIONS

Sathish Paulraj Gundupalli; Hait Subrata; Thakur Atul, "A review on automated sorting of source-separated municipal solid waste for recycling", Waste Management, Feb. 1, 2017 Elsevier, New York, NY, US-ISSN 0956-053X, vol. 60, pp. 56-74.

*Primary Examiner* — Quan M Hua
(74) *Attorney, Agent, or Firm* — Banner & Witcoff, Ltd.

(57) ABSTRACT

A method and system for performing characterization of one or more materials. One or more materials are scanned by means of a sensory system including an X-ray sensor configured to perform multi-energy imaging for obtaining at least a lower-energy X-ray image and a higher-energy X-ray image. Images obtained by means of the sensory system are segmented, and for each segmented object, data indicative of an area density and data indicative of an atom number by analysis of the lower-energy X-ray image and the higher-energy X-ray image, and data indicative of the area density and atom number is determined by means of a calibrated model. Data indicative of a mass is calculated based on the data indicative of the area density and the data indicative of the area of each of the segmented objects. The data indicative of the atom number is provided as input to a trained (Continued)

neural network, wherein the trained neural network is configured to label each segmented object, and wherein the data indicative of the mass is coupled to each of the labeled segmented objects.

16 Claims, 15 Drawing Sheets

(51) Int. Cl.
*G06V 10/82* (2022.01)
*G06V 10/774* (2022.01)

(52) U.S. Cl.
CPC .............. *G06T 2207/10116* (2013.01); *G06T 2207/20084* (2013.01)

(58) Field of Classification Search
CPC . G06T 7/001; G06T 2207/20084; G06T 7/11; G06T 2207/10056; G06T 2207/10061; G06T 2207/10152; G06T 7/0012; G06T 17/05; G06T 2207/10081; G06T 11/00; G06T 7/0002; G06T 2207/30004; G06T 2207/10024; G06T 2207/30108; G06T 7/10; G06T 7/62; G01N 15/10; G01N 2015/1006; G01N 2001/045; G01N 33/58; G06V 10/774; G06V 10/82
See application file for complete search history.

(56) References Cited

U.S. PATENT DOCUMENTS

| | | |
|---|---|---|
| 2012/0148018 A1 | 6/2012 | Sommer, Jr. et al. |
| 2015/0254833 A1 | 9/2015 | Deng et al. |
| 2017/0152104 A1 | 6/2017 | Grochowina |
| 2017/0328845 A1 | 11/2017 | Loeffler et al. |
| 2018/0128936 A1 | 5/2018 | Franco et al. |
| 2018/0243800 A1 | 8/2018 | Kumar et al. |
| 2018/0318882 A1 | 11/2018 | Rem et al. |
| 2018/0354121 A1 | 12/2018 | Sezaki |
| 2019/0030571 A1* | 1/2019 | Horowitz ............... B07C 1/04 |
| 2019/0047024 A1 | 2/2019 | Bourely et al. |
| 2019/0130560 A1 | 5/2019 | Horowitz et al. |
| 2019/0362485 A1* | 11/2019 | Piegay ............... G06V 30/416 |
| 2020/0074270 A1* | 3/2020 | Zadrozny ............... G06N 3/08 |

FOREIGN PATENT DOCUMENTS

| | | |
|---|---|---|
| DE | 4305006 A1 | 9/1993 |
| DE | 202015000612 U1 | 4/2015 |
| EP | 2570968 A2 | 3/2013 |
| WO | 2005065848 A1 | 7/2005 |
| WO | 2011159269 A1 | 12/2011 |
| WO | 2016097014 A1 | 6/2016 |
| WO | 2017106778 A1 | 6/2017 |
| WO | 2017220079 A1 | 12/2017 |
| WO | 2018028752 A1 | 2/2018 |
| WO | 2018200866 A1 | 11/2018 |
| WO | 2019056102 A1 | 3/2019 |

* cited by examiner

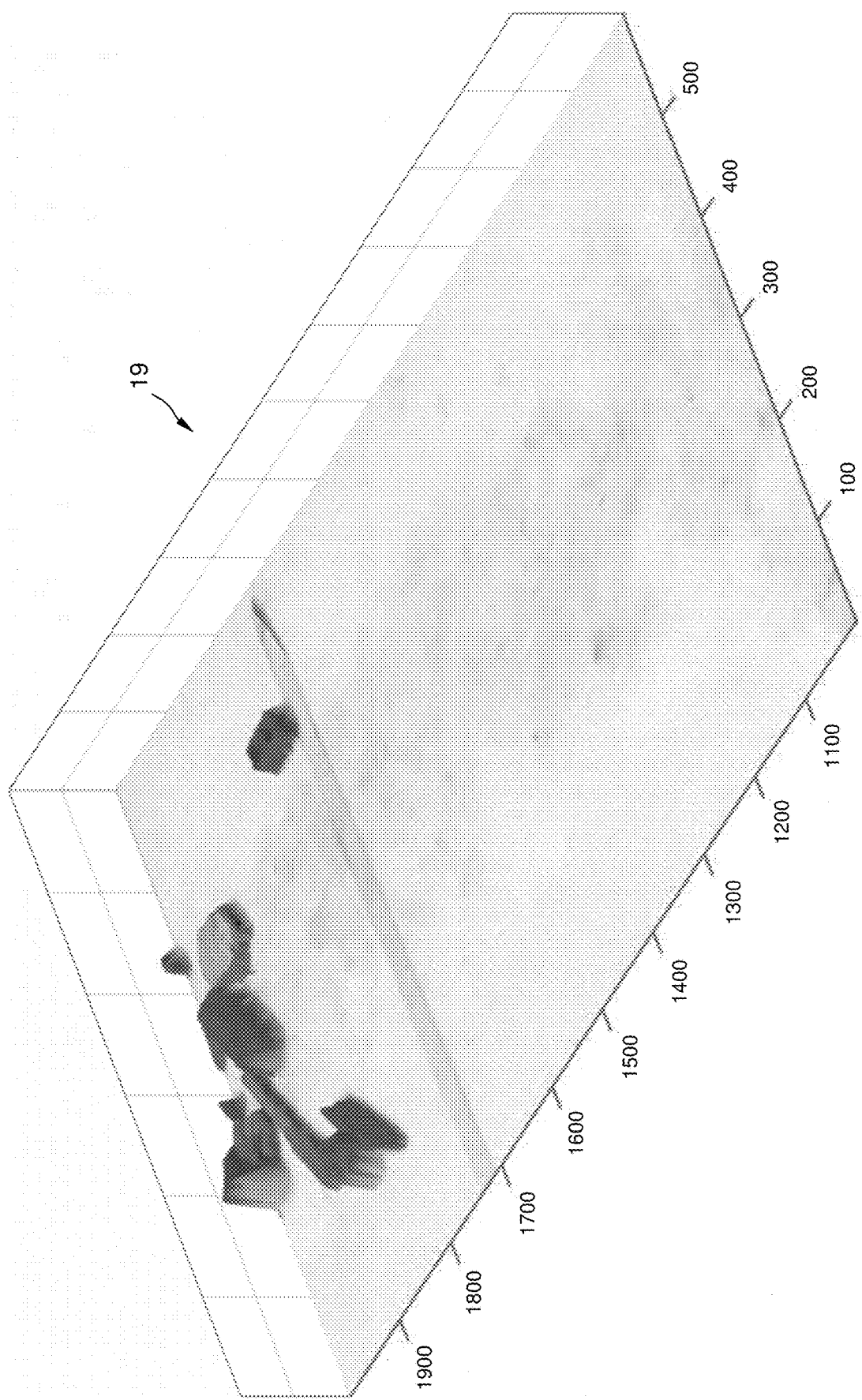
FIG. 4, Cont'd

METHOD AND SYSTEM FOR PERFORMING CHARACTERIZATION OF ONE OR MORE MATERIALS

CROSS-REFERENCE TO RELATED APPLICATIONS

This application is a U.S. National Stage application under 35 U.S.C. § 371 of International Application PCT/EP2020/087063, filed Dec. 18, 2020, which claims the benefit of priority to Application EP19217631.1, filed Dec. 18, 2019. Benefit of the filing date of these prior applications is hereby claimed. Each of these prior applications is hereby incorporated by reference in its entirety.

FIELD OF THE INVENTION

The invention relates to a method and system for performing characterization of one or more materials. The invention further relates to a computer program product. Furthermore, the invention relates to a recycling device configured to sort a waste stream.

BACKGROUND TO THE INVENTION

The characterization of one or more materials has several important applications, for example in recycling processes, agricultural processes, food productions processes, etc. The characterization can for instance be used for quality control, value assessment, and process engineering and control. For example, for waste processing, conventionally many waste streams are sub-optimally recycled due to the lack of characterization data. There is a need for an adequate characterization technology for material streams (e.g. bulk solid waste streams).

The conventional approach to waste characterization is still typically manual inspection of objects by a person, e.g. plant personnel working at a special facility. This approach is slow, subjective and, expensive and eventually it delivers only little information about the particles in the waste stream. In some conventional methods, samples are taken and tested/analyzed for instance in a laboratory. This process can take up too much time (chemical analysis make take days, weeks to months), and may result in increased costs. Furthermore, only a small fraction of the total amount of materials/objects are characterized. Typically, many material streams are sub-optimally recycled because the quality of the materials is difficult to measure.

There is a need for a fast, objective and/or automated method that delivers data on a more detailed level.

SUMMARY OF THE INVENTION

It is an object of the invention to provide for a method and a system that obviates at least one of the above mentioned drawbacks.

Additionally or alternatively, it is an object of the invention to provide for improved material characterization of one or more materials.

Additionally or alternatively, it is an object of the invention to provide for an improved material characterization.

Thereto, the invention provides for a method of performing characterization of one or more materials, the method comprising: scanning the one or more materials by means of a sensory system including an X-ray sensor configured to perform multi-energy imaging for obtaining at least a lower-energy X-ray image and a higher-energy X-ray image; performing segmentation of images obtained by means of the sensory system in order to separate one or more distinct objects in the images, wherein data indicative of an area of the segmented objects is determined; determining, for each of the segmented objects, data indicative of an area density and data indicative of an atom number by analysis of the lower-energy X-ray image and the higher-energy X-ray image, the data indicative of the area density and atom number being determined by means of a model which is calibrated by performing multi-energy X-ray imaging with different materials with known area densities and atom numbers; calculating, for each of the segmented objects, data indicative of a mass based on the data indicative of the area density and the data indicative of the area of each of the segmented objects; and providing, for each of the segmented objects, at least the data indicative of the atom number as input to a trained neural network, wherein the trained neural network is configured to label each segmented object, wherein the data indicative of the mass is coupled to each of the labeled segmented objects.

The objects in a material stream can be identified and characterized. The characterization of each individual object may provide different characterization parameters. This enables differentiating object in different material classes. Additionally or alternatively, a mass balance can be determined. Such derived information can be used for post-modelling using physical properties of the characterized objects. Additionally or alternatively, certain properties of each segmented objects, such as for example geometry, diameter, shape, chemistry, etc., can be determined.

The invention can effectively enable analyzing heterogeneous material flows. This can be performed without requiring extensive resources (work load, time, etc.). Even mass balances of the heterogeneous material flows can be efficiently determined, while the objects and/or materials in the material flow is not yet sorted.

The invention provides significant advantages in sorting a material stream, such as a waste stream. However, the invention can be used in various other applications other than material sorting. For example, it can be used for determining a value of a material stream. By identifying the characteristics of the different components in a material stream, a value can be estimated. Sampling of a material stream (e.g. waste stream) may take too much time and effort. The system according to the invention enables determining a mass balance and value estimation.

The mass may be estimated based on an X-ray model using an X-ray image with at least one energy level. The area density is mainly determined by high(er) energy absorption. By taking only into account a high(er) energy absorption, it is possible to make an estimation of the mass without requiring two or more energy level X-ray images (cf. a lower and higher energy level X-ray image). An estimation may be provided considering only one X-ray energy range. In practical cases, however, at least two X-ray energy levels may be employed.

The mass may be predicted based on an X-ray model using X-ray images with at least two different energy levels (it is also possible to make an estimation based on a single X-ray image (one energy level)). It will be appreciated that a multi-spectral X-ray imaging with more than two X-ray energy levels can also be employed. The X-ray images may be obtained by means of a same X-ray imaging device. However, it is also possible to use multiple X-ray imaging devices.

In some examples, a lower and higher energy X-ray image is taken of the one or more materials (e.g. material stream), and a model is used for calculating the area density and the atomic number from the two X-ray images of the one or more materials. The mass can be calculated based on the sum of all determined area densities. The mass of the segmented object can be calculated directly from the densities, based on the sum of all pixels of the segmented object. The atomic number provides additional information with regard to the chemical composition of the material. Knowledge about the atomic number for each individual segmented object/component can provide significantly improved material characterization taking into account the chemical composition. An atomic number may not be required for calculating the mass of the individual segmented object/components.

The area density can be seen as mass per area, and the mass can be determined based on the area and the area density. The area of each of the segmented objects can be identified on the basis of segmentation in the imaging data.

A lower energy X-ray image and a higher energy X-ray image may be taken, providing information about two ranges in the spectrum. In some examples, the at least two X-ray images can be taken at the same time. In the X-ray imaging, at least two values can be obtained for each point in the space (at least the lower energy and higher energy). In some examples, X-ray sensors are placed on top of each other. The upper sub-sensor may be sensitive to the lower energy and the lower sub-sensor may be sensitive to the higher energy. In some examples, multiple-energy X-ray imaging may be performed such that each pixel is linked to more than two values. In some examples, each pixel can be linked to two values, namely the lower and higher energy for dual energy X-ray imaging.

Advantageously, the invention may provide for an improved labeling using a trained artificial neural network. In this way, a better determination of objects/components of analyzed one or more materials can be obtained. For instance, a better determination of the material composition of a stream of material can be achieved. The labels of the segmented objects can also be considered as additional characterization data presentable to a user, for instance by means of a general user interface. In some examples, the determined data is used for drawing up a virtual model (digital twin of the one or more materials, e.g. material stream), enabling virtual experimentation or modelling. In some examples, the determined features/characteristics of the segmented objects are generic. The labels can provide more application-specific information (for example, labels for classes of batteries; wood and plastic; pine; oak; plastic; ferrous materials; non-ferrous materials; minerals; electrical components; metal scrap; concrete; etc.). It will be appreciated that the data can be used in different ways and that many different uses are envisaged. For example, a label can also be a price, or a quality type, a chemical composition and/or content, etc.

The features/characteristics can be considered as measurable quantities (enabling objective determination). The label can take into account subjective considerations (for instance price, perceived quality, ripeness, etc.). The invention can be employed on a wide variety of mixture of materials or material streams, for which the individual components/ objects therein are to be distinguished from each other. Optionally the mixture of materials or material streams includes at least one type of material within which a distinction is to be made.

Different algorithms can be used for providing segmentation of objects/components in the images. For instance, the method may include object detection algorithms. Examples of object detection algorithms are thresholding, watershed, semantic or instant segmentation by neural networks. Other algorithms are also possible for segmenting the objects/ components. The segmented objects may be cut out and individually assessed for feature/characteristic extraction.

Optionally, the segmented objects are individually processed for providing the classification using the trained neural network. This operation may also be performed at least partially in parallel. It is also envisaged that a plurality of trained neural networks are used.

Optionally, the X-ray sensor is a dual energy X-ray sensor. Dual energy X-ray imaging can be cheaper than multi-energy X-ray imaging. However, it is also possible to use a multi-energy X-ray sensor in the X-ray sensor, as more accurate results can be obtained in this way.

Optionally, the sensory system further includes a depth imaging unit for determining data indicative of a volume of segmented objects.

Different types of depth imaging units can be used. A value indicative of volume can be an important metric for characterizing one or more materials;

Optionally, the depth imaging unit includes at least one of a three-dimensional laser triangulation unit or three-dimensional camera.

Other types of depth imaging units are also possible.

Optionally, the sensory system further includes a color imaging unit configured to take color images of the segmented objects.

A plurality of sensors may be used for sorting waste. In some examples, a first sensor is used to get an indication of, among other things, the area density (e.g. employing X-ray) and a second sensor to get an indication of, among other things, a volume (for example 3D camera, laser triangulation, etc.). Other sensors can also be used to gather even more information, such as a color camera. In an advantageous embodiment, a number of pre-processing steps are performed before the recorded sensor data is fed to a trained neural network. The images are aligned and detected objects are segmented. Aligning the images may involve at least one of: shifting, scaling, shearing, changing perspective, etc. It may involve any other distortion corrections to the image for obtaining aligned images. A number of properties are determined for each object such as mass, volume, atomic number, density, shape, etc. This data is then used as input for the neural network. This allows a neural network to be obtained which can better distinguish between different materials, and thus waste groups in a waste recycling application. A more efficient neural network can also be obtained in this way.

Optionally, data from different subsystems of the sensory system is aligned prior to determining characteristic features for each of the one or more segmented objects.

In some examples, X-ray imaging is used for determining mass and atomic number for each of the segmented objects. However, other sensors may also be used for imaging. Optionally, images from different sensors are aligned for data fusion. For example, the sensors and/or detectors for imaging may have a different field of view, different distortions, magnifications, etc. The alignment can be carried out by performing alignment or transformation algorithms on the plurality of imaging data received from the plurality of sensors/detectors.

In some examples, data from different imaging sensors/ detectors may be put in a 3D matrix having a plurality of 'image layers', such as for instance for, red-green-blue image data, lower energy X-ray, higher energy X-ray, height (3D camera). Also additional data may be included, such as derived images relating to atomic number, surface density image, density (e.g. by combining volume and surface density, a density can be determined for each of the segmented objects/components).

Optionally, for each of the one or more segmented objects further characteristic features relating to at least one of a volume, dimension, diameter, shape, texture, color, or eccentricity are determined. Other characteristic features can also be determined, such as for instance mean, standard deviation, third and higher moments, histograms, etc. of object pixel values of the different sensor images e.g. x-ray absorption, height, color, etc. and derived images such as atomic number, area density, density, chemical composition and gradients. Some exemplary shape parameters which can be determined are: perimeter, solidity, area, convex area, convexity, roundness, straightness, curliness, sphericity, aspect ratio, ferret diameter, equivalent diameter, minor and major axis length, max & min chord length, other diameter definitions. It will be appreciated that Any combination of previous characteristic features are also possible.

As a plurality of characteristics are determined for each of the segmented objects, the objects can be arranged in a multi-dimensional space. This can provide enhanced overview of a material stream via for example a general user interface of a computer program product handing the determined characteristics of the one or more materials.

Optionally, the one or more materials are moved on a conveyor forming a material stream, wherein the material stream is scanned by means of the sensory system for characterization of objects in the material stream.

In some examples, first the objects (e.g. components, particles) in the material stream are segmented. In this way, the objects can be easily cut out and separated and/or isolated. The objects can be isolated even when they are touching each other. In a next step, a series of features/characteristics of each particle can be identified. These features/characteristics can then be fed to a machine learning model such as an artificial neural network.

The mass of particles, volume, diameter, shape, texture, contours, etc. can be determined on-the-fly or in real-time. A mass of the objects can be calculated using contactless measurements (cf. X-ray). The mass of the individual objects may be calculated using a physical model based on X-ray physics. This can be considered as a pre-processing step prior to feeding the imaging data to a neural network for classification. Other techniques may also be used for determining the mass of the individual objects. In some examples, a machine learning model is employed.

Optionally, characteristic features of the one or more segmented objects are stored in order to build a digital twin model.

The invention enables characterization at component level of a material stream. In this way, a digital twin model can be set up. Virtual tests and simulations can then be performed using the digital twin model.

A physical material stream can be scanned and converted into a virtual representation, also referred to as a 'digital twin'. This digital counterpart contains the physical properties of all the particles in the stream, such as mass, volume, density, shape, size, material, visual appearance, texture etc. as well as the original images taken by the different cameras. The digital twin allows virtual experimenting (for example perform sieving experiments based on computer data rather than making your hands dirty in the lab), particle-based process simulation and provides an accessible and intuitive way to dig into a material stream to gain new insights.

Optionally, the one or more materials are characterized prior to transportation for determining a first digital identification marker, wherein subsequently after transportation to a remote location, the one or more materials are characterized for determining a second digital identification marker, wherein the first and second digital identification markers are compared with respect to each other in order to determine change of contents during transportation.

In some examples, a container or cargo contains heterogeneous materials. The cargo may be transported over a large distance and re-characterized. As detailed characterization can be provided, digital fingerprinting can be performed on a detailed level. If this is done from the departure point and the arrival point, it can be determined if the container or cargo has been tampered with. It can be checked whether the container/cargo including its content is the same. Furthermore, details about what has been added or what has been taken out can be identified.

Optionally, the one or more materials are non-homogeneous.

It will be appreciated that a material stream can be defined as a flow of materials. In some examples, a stream can be a specific material category that is diverted in a specific way. In some examples, a stream can be a mixture of several material categories that are diverted in a specific way. Examples of material streams include deconstructed materials sent to reuse markets, commingled waste sent to mixed-waste recycling facility, etc.

Optionally; the one or more materials are selected from a group consisting of solid waste, produced products or components, agricultural products, or batteries.

The invention provides significant advantages when applied for sorting of waste batteries. Batteries may have a same appearance (e.g. from the outside some batteries may often look the same). A stream of batteries including different battery types can be guided along a conveyor belt. Different types of batteries can be effectively distinguished from each other using the method according to the invention. For example, a distinction can be made between alkaline batteries and lithium ion batteries. Furthermore, features such as size, shape, arrangement (e.g. battery pack), can also be used for making a distinction between the different batteries in the battery stream. It is also possible to identify what material is included in an identified/segmented battery, for instance, which cathode material is housed in the battery (e.g. cobalt-nickel, . . . ).

In some examples, the method is used for characterization of agricultural processes. For instance a current of pears (or other fruit) can be characterized. A first feature may be defined as a value indicative of the (relative) amount of small dots on an external surface of the pear, a second feature may be defined as a value indicative of how many large spots are present on the external surface of the pear, a third feature may be defined as a value indicative of the volume of the pear, etc. The label can then be defined as a commercial value of the individually segmented pear, for example. It will be appreciated that in this example other features/characteristics and/or labels can also be defined. Other applications are also possible, for instance for characterization of a food stream.

In some examples, the method may include at least some of the following steps: imaging of one or more materials (e.g. X-ray scanning) to obtain at least one image; segmenting and clipping components from that image; identify features and/or characteristics for individual segmented components, such as for instance mass (e.g. based on dual or multi energy X-ray imaging), volume (e.g. based on 3D image), atomic number, shape, eccentricity, dimensions, etc.

Optionally, a direct, inline characterization system for bulk solid waste streams is provided.

According to an aspect, the invention provides for a system for performing characterization of one or more materials, the system comprising: a sensory unit arranged for scanning the one or more materials, the sensory unit including an X-ray sensor configured to perform multi-energy imaging for obtaining at least a lower-energy X-ray image and a higher-energy X-ray image; wherein the system includes a controller configured to perform the steps of: performing segmentation of images obtained by means of the sensory system in order to separate one or more distinct objects in the images, wherein data indicative of an area of the segmented objects is determined; determining, for each of the segmented objects, data indicative of an area density and data indicative of an atom number by analysis of the lower-energy X-ray image and the higher-energy X-ray image, the data indicative of the area density and atom number being determined by means of a model which is calibrated by performing multi-energy X-ray imaging with different materials with known area densities and atom numbers; calculating, for each of the segmented objects, data indicative of a mass based on the data indicative of the area density and the data indicative of the area of each of the segmented objects; and providing, for each of the segmented objects, at least the data indicative of the atom number as input to a trained neural network, wherein the trained neural network is configured to label each segmented object, wherein the data indicative of the mass is coupled to each of the labeled segmented objects.

A manual process of waste sorting takes a lot of time and resources. The manual sorting is not only inefficient, but also prone to errors. The invention provides for an improved characterization system, which may be employed in a sorting system in some examples. It is possible to characterize and track information of each component, object or particle. The invention can also be used in other applications, for instance in agriculture and/or food processing applications. For example, a batch or stream of strawberries can be characterized in a detailed way for quality determination. Additionally, based on the characterization, a value of the batch or stream of strawberries can be estimated.

The invention can also be used in other applications, for instance for process control of a separation plant (waste recycling plant). In some examples, such plant comprises one or more physical separation units (e.g. sieve, eddy current, magnetic separator, vibration separator, etc.). The effectiveness of the one or more separation units can be assessed, even on-the-fly and/or in real-time. This can enable the devices to be optimized and tuned based on a quality control. For example, if separated particles or parts become larger than a value, a certain gap must may be tuned in order to separate smaller particles or parts. In conventional solutions this is not possible as the whole process is to be stopped for taking samples and performing characterization measurements.

Advantageously, pre-processing and features extraction steps can be performed prior to feeding data to the trained artificial neural network for labeling objects. A plurality of features/characteristics can be determined per segmented object. A label can then be assigned to each object. A trained neural network can be used for automatic determination of a label associated with each segmented object, taking into account the plurality of determined features/characteristics linked to the segmented object. According to the invention, instead of directly feeding imaging data to a neural network, the imaging data is segmented in order to identify individual components for which the features/characteristics are fed to the trained neural network. Optionally, imaging data from different sensors/detectors are aligned enabling a data fusion. Significantly more accurate results can be obtained in this way. It is also possible to additionally input the imaging data to the trained neural network. Hence, instead of giving the pixels of an image as input, the features/characteristics coupled to each of the objects are given as input. That can be performed effectively for each object. The input to the trained neural network can for instance be (cf. input nodes at the first layer of the neural network): mass, volume, atomic number, shape parameters such as eccentricity, etc. The output of the neural network may provide a classification of the segmented object.

The system can provide for an efficient and effective characterization of one or more materials (e.g. material stream), with a relatively high throughput.

According to an aspect, the invention provides for a computer program product configured for performing, when run on a controller, the steps of the method according to the invention.

According to an aspect, the invention provides for a recycling device configured to sort a waste stream, wherein the recycling device includes the system according to claim 12 for distinguishing different materials in the waste stream.

Optionally, the recycling device is configured to control process parameters based on the information relating to the distinguished different materials in the waste stream.

The method enables providing real-time mass balances of well-defined sub-fractions without the need for a separation step, and hence for example a complete value assessment. This can allow recycling plants to reduce, and eventually completely skip, the costly and labour-intensive sampling procedures, with standard lead times of industrial analyses ranging from several weeks up to 3 months coupled to chemical analysis in analytical laboratories and to decrease uncertainty.

According to an aspect, the invention relates to the use of the system for characterization of one or more materials.

According to an aspect, the invention provides for an inline characterization system adapted for the in-line characterization of complex heterogeneous material streams. The system can be equipped with multiple sensors positioned above a conveyor belt of for example 1$m$ width moving with speeds up to 1 m/s. Materials may be presented in a mono-layer on the belt. Optionally, means are provided for ensuring a mono-layer. Installed sensors include dual-energy x-ray transmission (DE-XRT), allowing to directly measure the average atomic number and mass and basically 'see through materials'; an optional 3d laser triangulation (3D-LT), allowing to determine the exact volume and shape; and an optional high-resolution colour camera. The data from these sensors can be processed by a controller. The controller may be configured to align and fuse received data of different sensors/detectors, as well as apply models and algorithms based on artificial intelligence and machine learning to detect, classify and measure individual objects/components on the belt.

The inline characterization system can be configured to use X-ray to 'see' through materials, not just at the surface layer. This allows to identify composite materials, e.g. materials where the value is hidden below a layer of protection or dust. Moreover, the integrated dual-energy X-ray transmission (DE-XRT) technology allows to directly measure the mass of objects without the need for directly weighing them. In addition, it directly measures the average atomic number. Complemented by object volume & 3D shape measurement (using 3D laser triangulation (3D-LT)) also the density can be derived. Additionally or alternatively, a high-resolution colour camera can be installed, allowing to identify structures, patterns, colors, shapes, texts, etc. for instance using machine learning models (e.g. deep learning algorithms). Geometric algorithms may be used for precise alignment of the sensor data which is recorded from different perspectives.

According to an aspect, the invention provides for a method of and system for performing characterization of one or more materials, wherein the one or more materials are scanned by means of a sensory system including an X-ray sensor configured to perform multi-energy imaging for obtaining at least a lower-energy X-ray image and a higher-energy X-ray image. Further, segmentation can be performed of images obtained by means of the sensory system in order to separate one or more distinct objects in the images, wherein data indicative of an area of the segmented objects is determined. Further, for each of the segmented objects, data indicative of an area density and data indicative of an atom number can be determined by analysis of the lower-energy X-ray image and the higher-energy X-ray image, the data indicative of the area density and atom number being determined by means of a model which is calibrated by performing multi-energy X-ray imaging with different materials with known area densities and atom numbers. Further, for each of the segmented objects, at least the data indicative of the atom number can be provided as input to a trained neural network, wherein the trained neural network is configured to label each segmented object.

It will be appreciated that any of the aspects, features and options described in view of the method apply equally to the system and the described recycling device and computer program product. It will also be clear that any one or more of the above aspects, features and options can be combined.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing.

DETAILED DESCRIPTION

Figure 1:
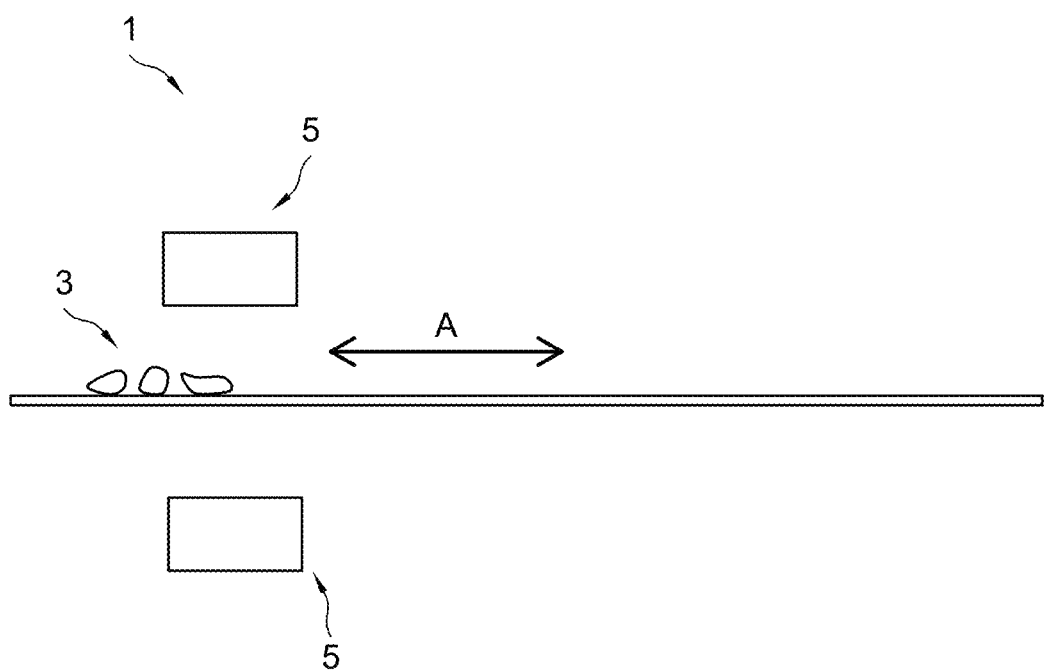
FIG. 1 shows a schematic diagram of an embodiment of a system.

FIG. 1 shows a schematic diagram of an embodiment of a system 1 for performing characterization of one or more materials 3, the system 1 comprising: a sensory unit 5 arranged for scanning the one or more materials 3. The sensory unit 5 includes an X-ray sensor configured to perform multi-energy imaging for obtaining at least a lower-energy X-ray image and a higher-energy X-ray image. The system 1 includes a controller configured to perform the steps of: performing segmentation of images obtained by means of the sensory system 5 in order to separate one or more distinct objects in the images, wherein data indicative of an area of the segmented objects is determined; determining, for each of the segmented objects, data indicative of an area density and data indicative of an atomic number by analysis of the lower-energy X-ray image and the higher-energy X-ray image, the data indicative of the area density and atom number being determined by means of a model which is calibrated by performing multi-energy X-ray imaging with different materials with known area densities and atom numbers; calculating, for each of the segmented objects, data indicative of a mass based on the data indicative of the area density and the data indicative of the area of each of the segmented objects; and providing, for each of the segmented objects, at least the data indicative of the atom number as input to a trained neural network, wherein the trained neural network is configured to label each segmented object, wherein the data indicative of the mass is coupled to each of the labeled segmented objects. In this example the sensory unit 5 and the one or more materials 3 are movable with respect to each other as indicated by arrow A. In this way, the sensory unit can scan the one or more materials 3. For instance, a conveyor belt can be used for guiding the one or more materials 3 along the sensory unit 5. However, it is also possible that the sensory unit 5 is moved with respect to one or more materials 3.

The invention enables to assign a mass to each segmented object. This means that a total mass balance can be assigned per class of objects.

In some examples, the mass can be provided as input to the trained neural network. A combination of mass and chemical properties (cf. atomic number) provides a good prediction of the label by means of the trained artificial neural network.

In some examples, the mass is used at least at the output, after a classification is assigned to each of the segmented objects using the trained neural network, the mass being used to create the mass balance.

Figure 2:
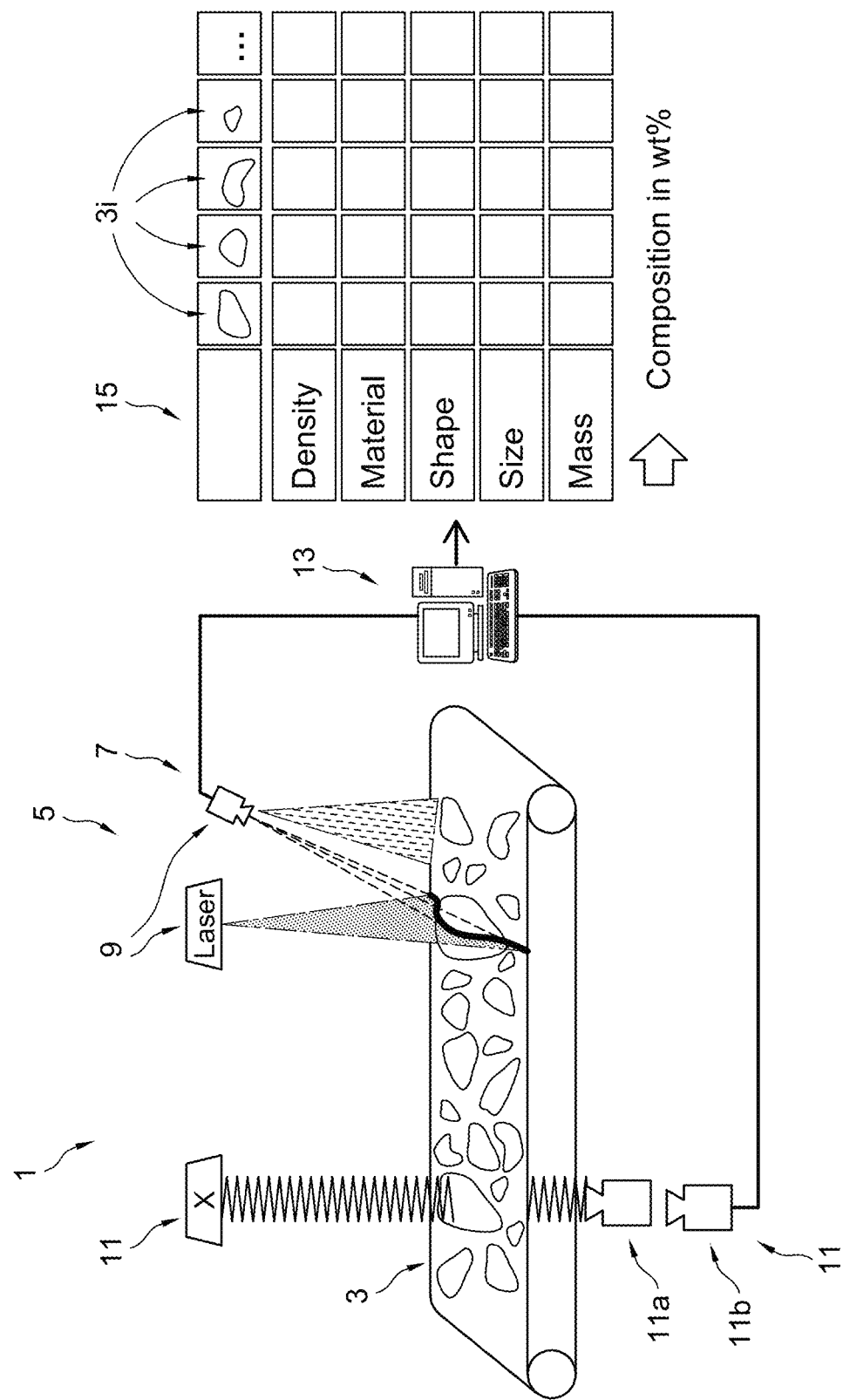
FIG. 2 shows a schematic diagram of an embodiment of a system.

FIG. 2 shows a schematic diagram of an embodiment of a system 1. In this example, at least one of an optional (color) camera 7 or optional 3D laser triangulation unit 9 are arranged in order to enable determining additional characteristics linked to each of the segmented objects. Hence, in some examples, next to features/characteristics relating to material type, mass, etc., it is also possible to make a distinction between the identified and/or segmented objects based on at least one of size, shape, color, texture, visual insights, etc. Such information may also enable virtual experimenting. In this example, the sensory unit 5 includes an X-ray sensor 11 having two X-ray sub-units 11*a*, 11*b* for performing dual-energy X-ray imaging. Furthermore, the camera 7 and 3D laser triangulation unit 9 are integrated in the sensory unit 5. In this way, the sensory unit 5 provides a plurality of images which can be aligned and/or fused, for instance by a computer unit 13. Aligning and/or fusing of the imaging data obtained from different camera's/detectors can enable a better determination of the features/characteristics of the segmented objects. The one or more materials are segmented and the individual segmented objects 3*i* are analyzed for determining relevant features/characteristics thereof. In this example, the following features 15 are determined for each segmented object: density, material, shape, size and mass. It will be appreciated that other sets of features are also possible. From the data it is also possible to derive a (relative) weight (percentage) of each of the segmented objects.

The system according to the invention can be faster and more autonomous in characterization of one or more materials, while requiring less (labor-intensive) input from humans. The system can provide important advantages in the application of waste characterization.

In order to develop a model that recognizes different (images of) waste particles and classifies them into different categories, a machine learning model can be trained by showing it a lot of images, each image accompanied by a label that describes what is in it. The conventional approach, in which all data is labeled in advance, is known as supervised learning. This labeled data represents the fuel of machine learning algorithms. For the waste characterization technology, labeled data can typically be generated by scanning physical "pure" mono-material streams, which are often manually prepared by meticulously selecting thousands of individual particles from a heterogeneous waste stream.

The characterization of waste has several important applications in the recycling industry. It can be used for value assessment. Fast and reliable value assessment of complete material streams decreases the risk of exposure to volatility of commodity stock markets. Further, it can be used for quality control. In a circular economy, it is desired that the quality of recycled products is guaranteed. The characterization technology helps to establish market trust. Further, it can be used for process engineering. The technical and economic feasibility of waste recycling processes and design of new processes by virtual experimenting can be assessed. Further, it can be used for online process optimization. Sorting processes can be measured, controlled and optimized on-the-fly.

The invention can provide for a direct, inline characterization technology that assess the materials both qualitatively (material type, chemistry, purity, . . . ) and quantitatively (mass balances, physical properties, . . . ). Such an in-line characterization system can be configured to assess heterogeneous and complex material streams completely, eliminating the need for subsampling. Moreover, mass-balances can be produced on-the-fly. In fact, for each material object, a digital twin can be created which can be further assessed in a virtual way.

Figure 3:
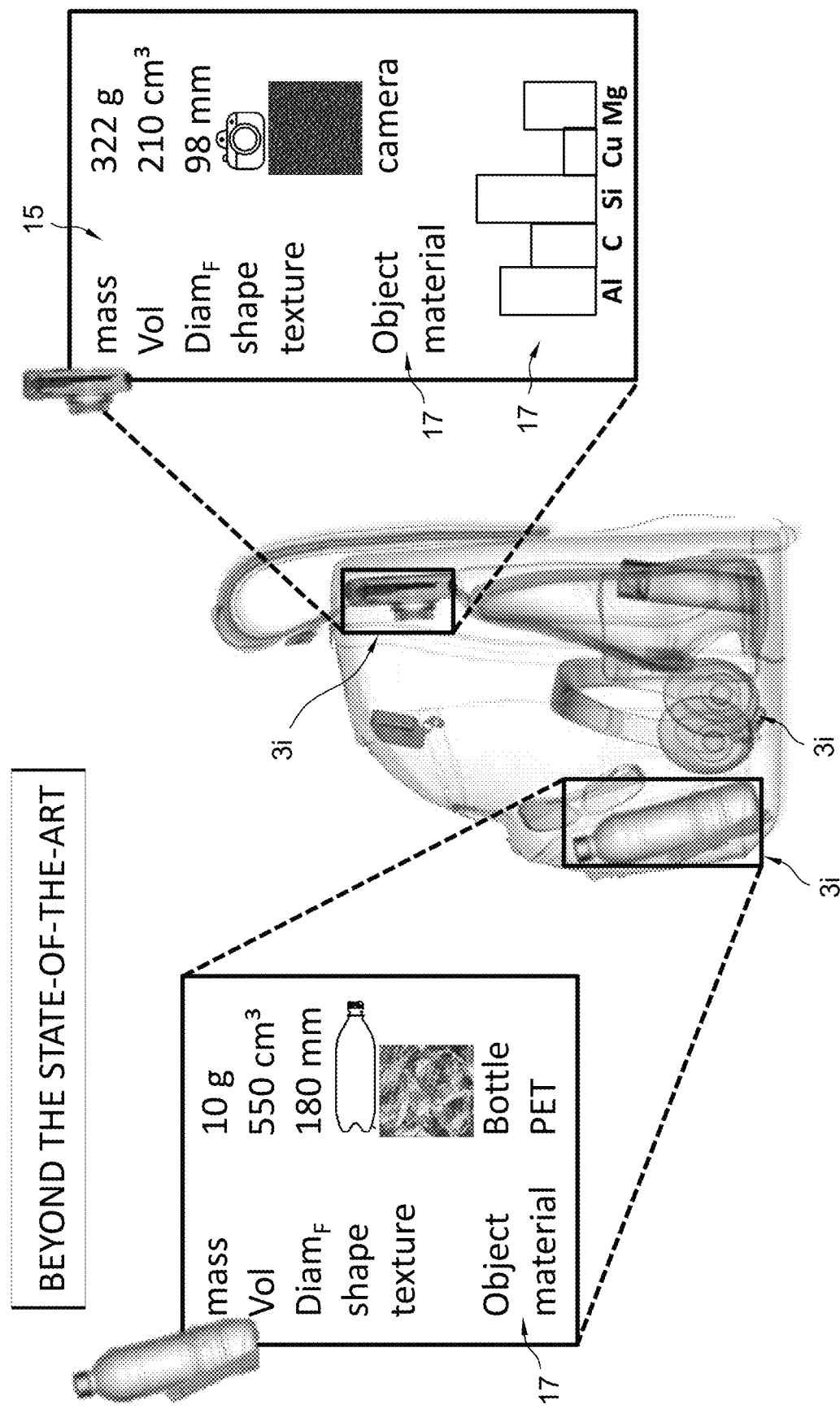
FIG. 3 shows a schematic diagram of characterized materials.

FIG. 3 shows a schematic diagram of characterized materials using the method according to the invention. Different objects 3*i* are segmented and the relevant characteristics/features are determined. The information can be presented for instance using a general user interface. In this example, the features include mass, volume, diameter, shape, and texture. Furthermore, labels 17 determined by means of the trained neural network can also be provided. In this example, two labels 17 are provided, namely object type (e.g. bottle, camera, headphone, etc.) and material (e.g. PET, composition of materials, etc.). It will be appreciated that other features and/or labels are also possible.

Figure 4:
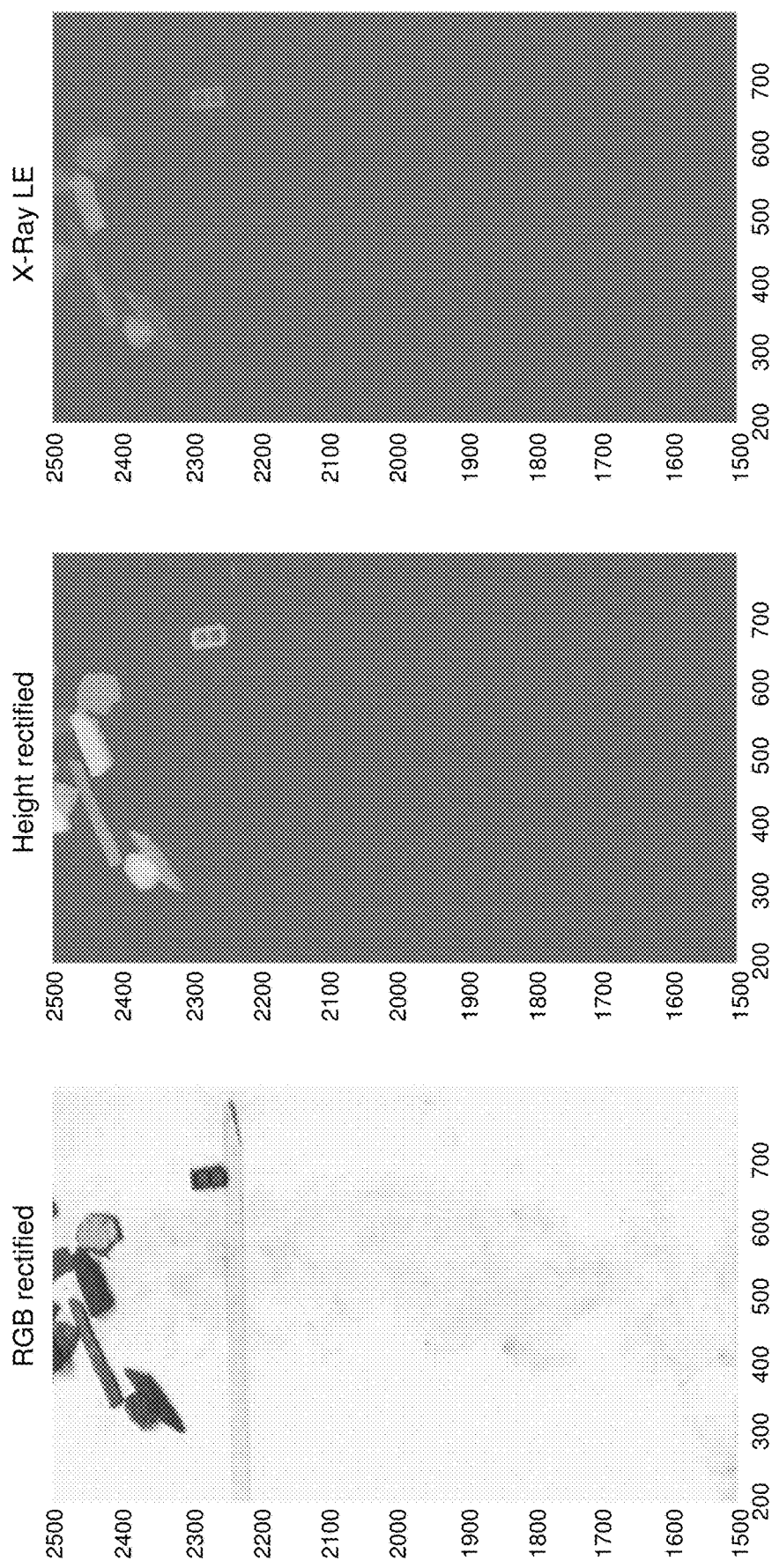
FIG. 4 shows a schematic diagram of data fusion.

FIG. 4 shows a schematic diagram of data fusion. In this example the sensory unit 5 includes a plurality of imaging sensors, namely a RGB color camera, a height sensor (e.g. laser triangulation, or 3D camera), and an X-ray sensor (e.g. dual-energy X-ray sensor providing a low energy and high energy X-ray image). It will be appreciated that it is possible to integrate two separate sensors instead of using two separate sensors. For instance a 3D camera can be used for providing both height information and RGB color images. A fused image 19 can be obtained images from different sensors or subunits of the imaging unit 5.

The absorption of X-rays are measured by means of X-ray imaging. The absorption of X-rays can be proportional to the mass for a particular material. However, a relatively thin material with a lot of absorption (e.g. lead) can give a similar X-ray image as a very thick material with little absorption. A lower energy image and a higher energy image can be used in order to make a distinction between such cases, enabling material discrimination.

By combining multiple sensors (e.g. XRT and 3DLT) physical/chemical properties of segmented objects can be determined or directly measured. The measured and/or determined characteristics can be provided as input to a machine learning model for providing a label. The value and composition of complex heterogeneous material streams can be quantified resulting in cost and time savings for recycling companies compared to current sampling and analysis procedures.

Figure 5:
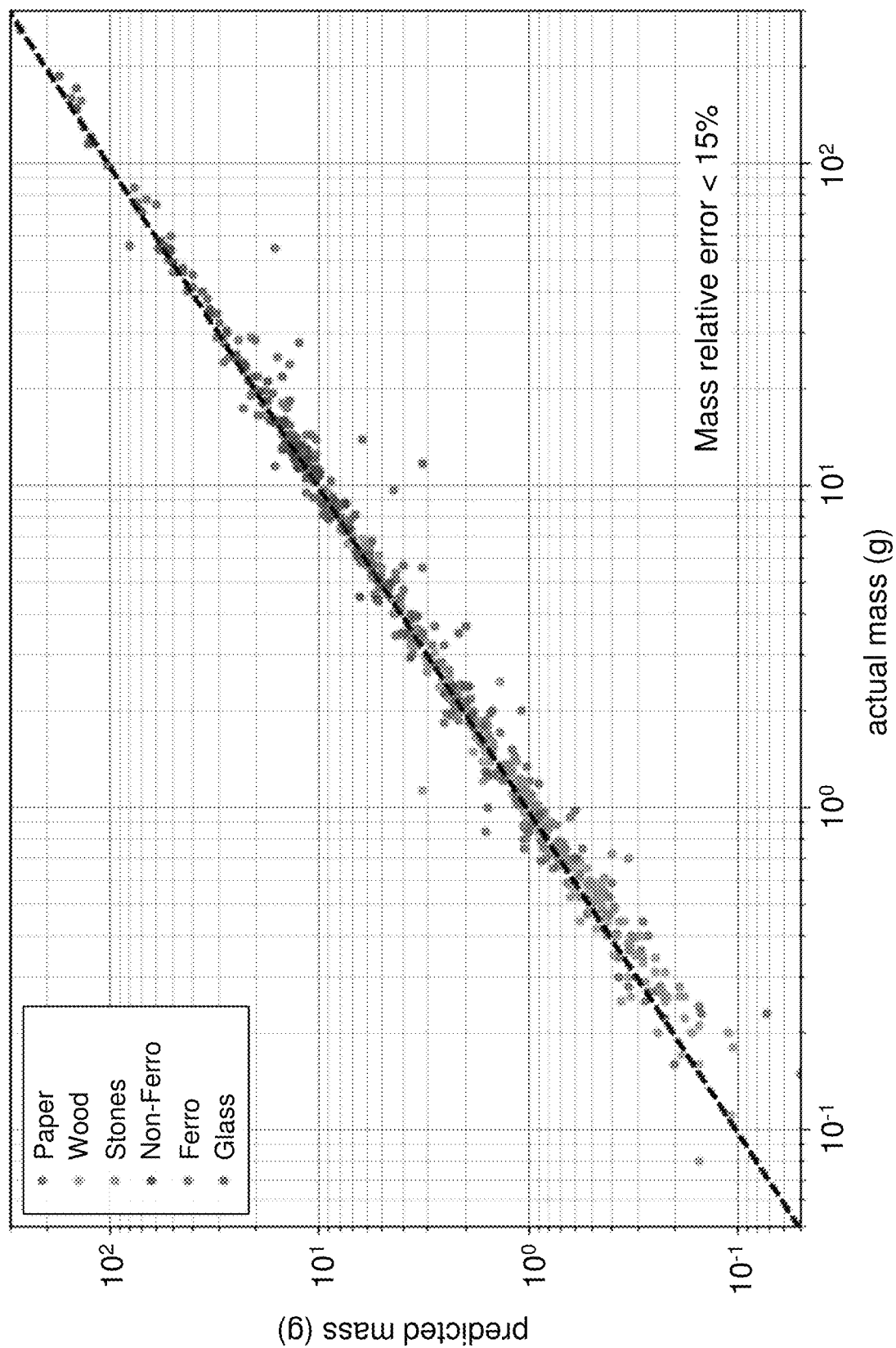
FIG. 5 shows a schematic diagram of a graph.

FIG. 5 shows a schematic diagram of a graph in which the actual mass is plotted versus the predicted mass for different material types. It can be seen that the model for determining the mass based on a lower-energy X-ray image and a higher-energy X-ray image provides accurate results. The mass relative error is less than 15 percent.

Figure 6:
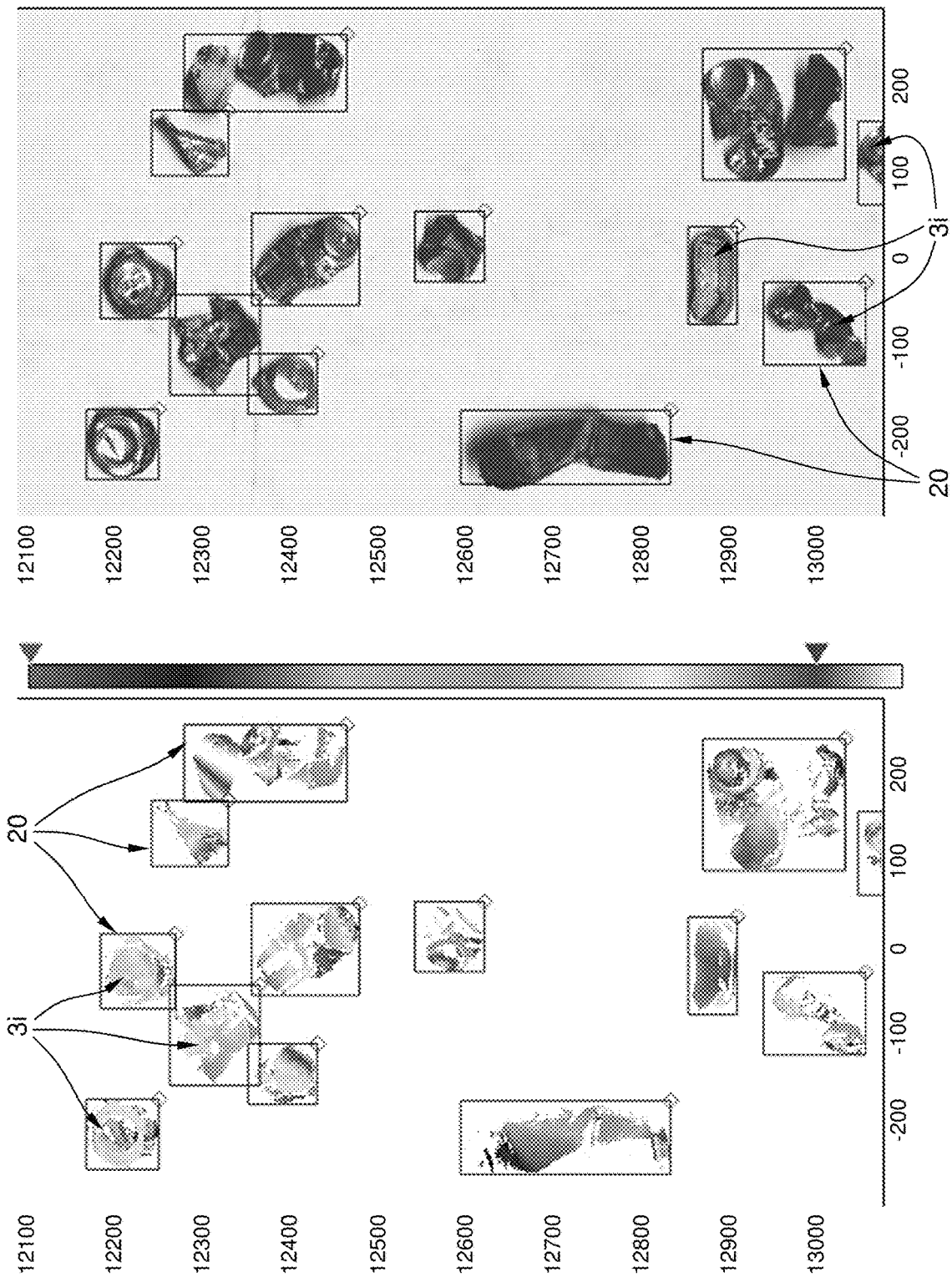
FIG. 6 shows a schematic diagram of segmented images.

FIG. 6 shows a schematic diagram of segmented images. The segmentation of objects 3*i* are visualized by bounding boxes 20. The boxes 20 are rectangular in this example, but other shapes are also possible. Other segmentation techniques are also possible. For instance, it is also possible to segment contours of the identified objects 3*i*. For each of the segmented objects 3*i*, one or more features/characteristics can be determined. These characteristics can be fed to the trained neural network for providing an application-specific label.

Figure 7:
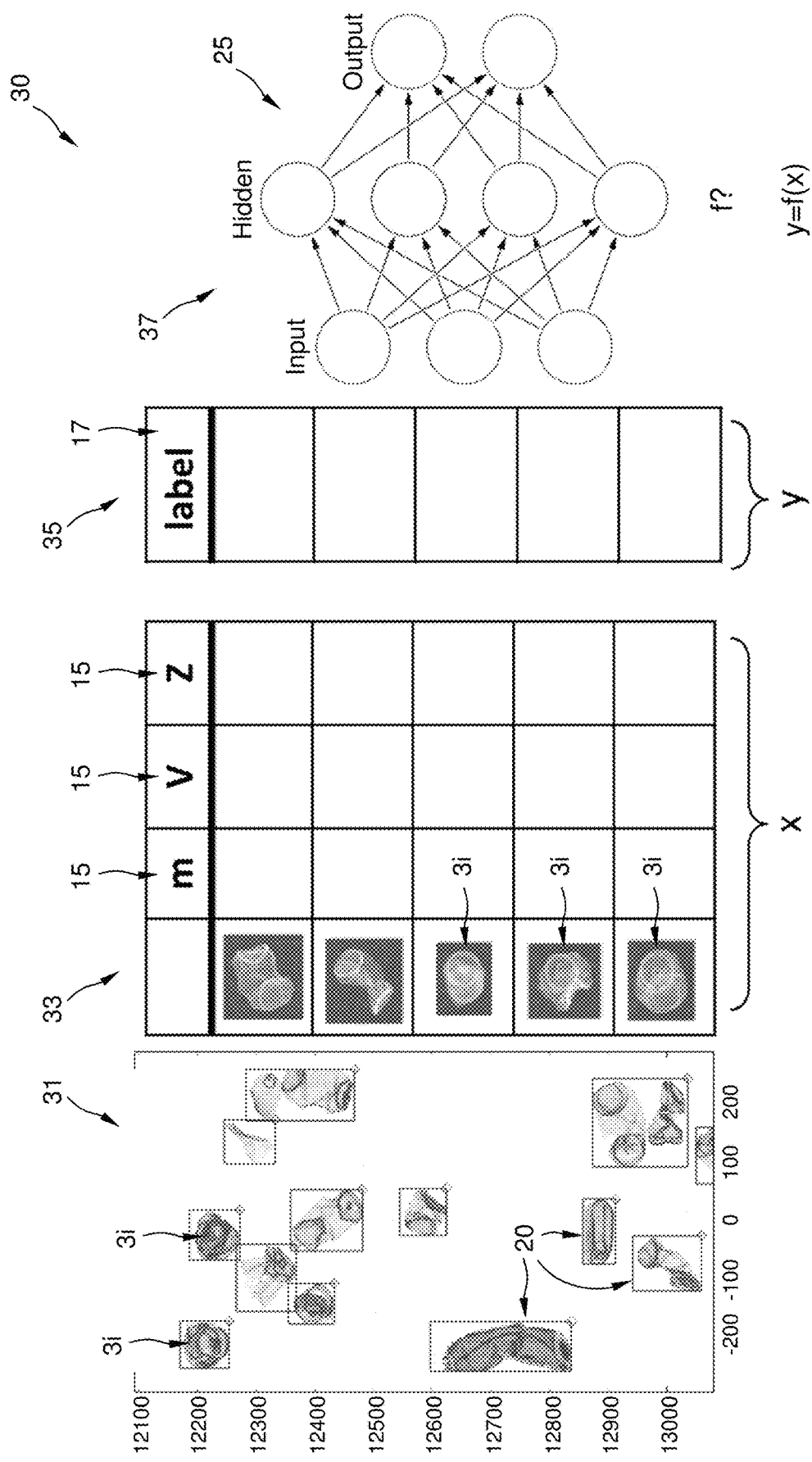
FIG. 7 shows a schematic diagram of a method.

FIG. 7 shows a schematic diagram of a method 30. In a first step 31, the objects or components of the one or more materials are identified and segmented. This can be performed by means of object-detection algorithms and/or segmentation algorithms. The image is obtained using the sensory unit 5. It is also possible that the acquired image being segmented is obtained after performing alignment and/or fusion of different images, for instance coming from different sensors or sub-units of the sensory unit 5. In this example, boxes 20 are provided around the segmented objects 3*i*. In a second step 33, characteristics/features 15 are determined for each of the segmented objects 3*i*. In this example, the mass, volume and atom number is determined. The data can be provided as an input to the trained neural network 25 for obtaining a label 17 as output. In this example, the trained neural network is a deep learning model. However, other machine learning models can also be used. In some examples, an alternative regression model is used instead of an artificial neural network.

Figure 8:
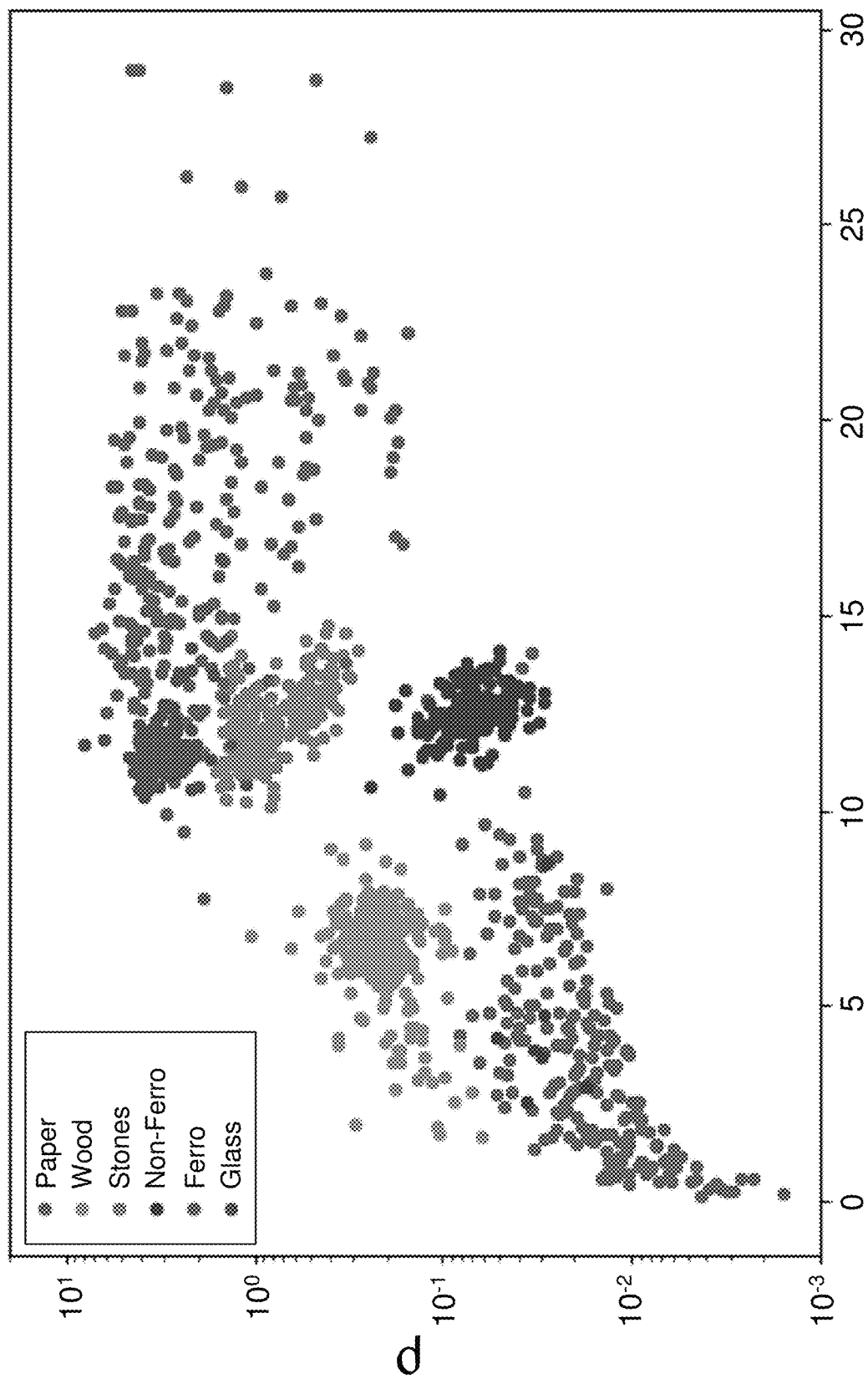
FIG. 8 shows a schematic diagram of a graph

FIG. 8 shows a schematic diagram of a graph. The plurality of identified segmented objects 3*i* can be divided into one or more clusters such that each cluster contains components having similar features and/or characteristics. The objects can be grouped together in this way, providing more insights in the composition of the one or more materials (e.g. waste stream). In this example, a 2D cluster is provided taking into account the density and the atom number. It will be appreciated that various other cluster graphs are possible.

The invention enables material stream characterization on object/component level. In addition to particle size distribution or a mass balance, tailor-made quality metrics can be defined based on the (directly measured) physical properties of individual objects of the one or more materials (e.g. material stream). Doing so, the technology builds a digital twin of a physical material stream, allowing virtual experimenting, new insights and better value assessment. The invention enables sorting of heterogeneous waste streams with high classification accuracies and accurate mass balances without the need of a sorting step.

Figure 9:
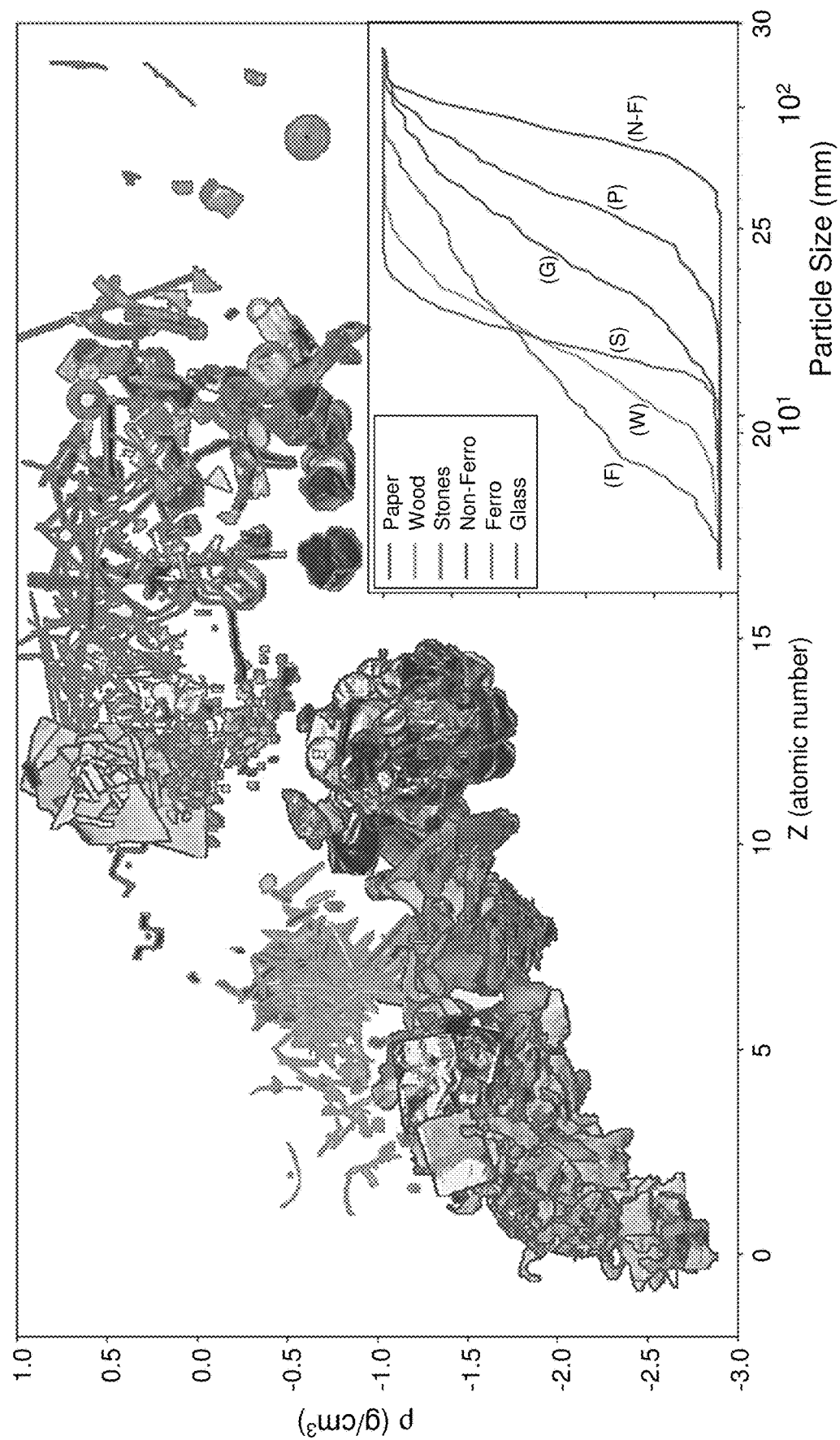
FIG. 9 shows a schematic diagram of a graph

FIG. 9 shows a schematic diagram of a graph similar to that of FIG. 8. In this example, the plurality of identified segmented objects 3i are shown in the graph, enabling a more visual insight in the composition of the one or more materials being characterized.

Figure 10A:
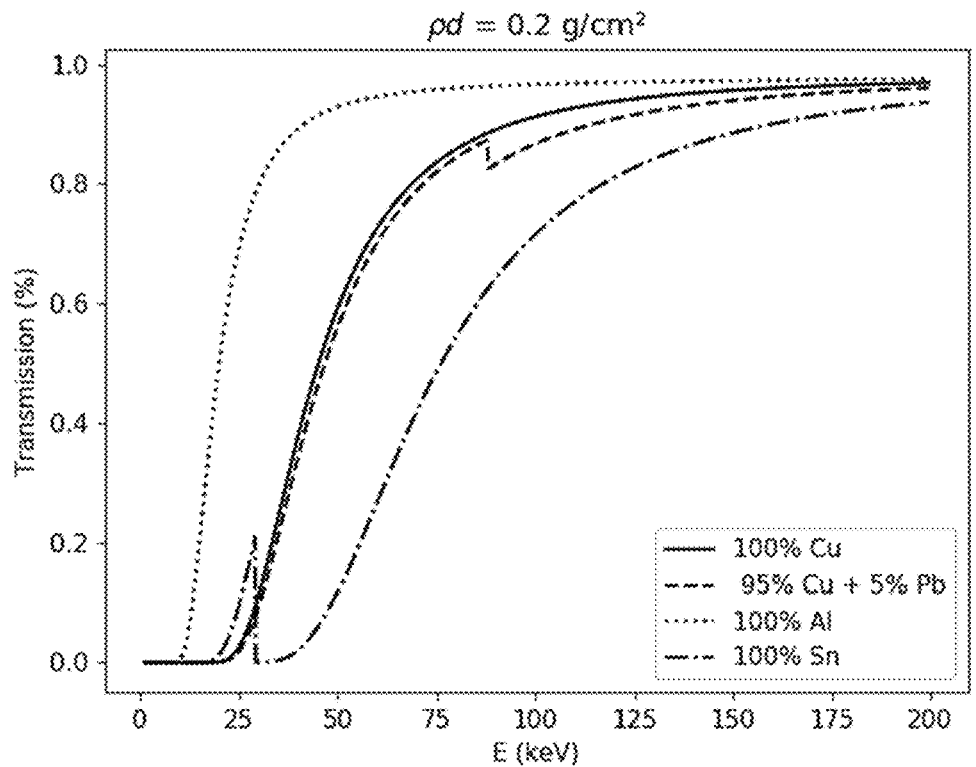
FIG. 10*a*, 10*b* show a schematic diagram of graphs.
Figure 10B:
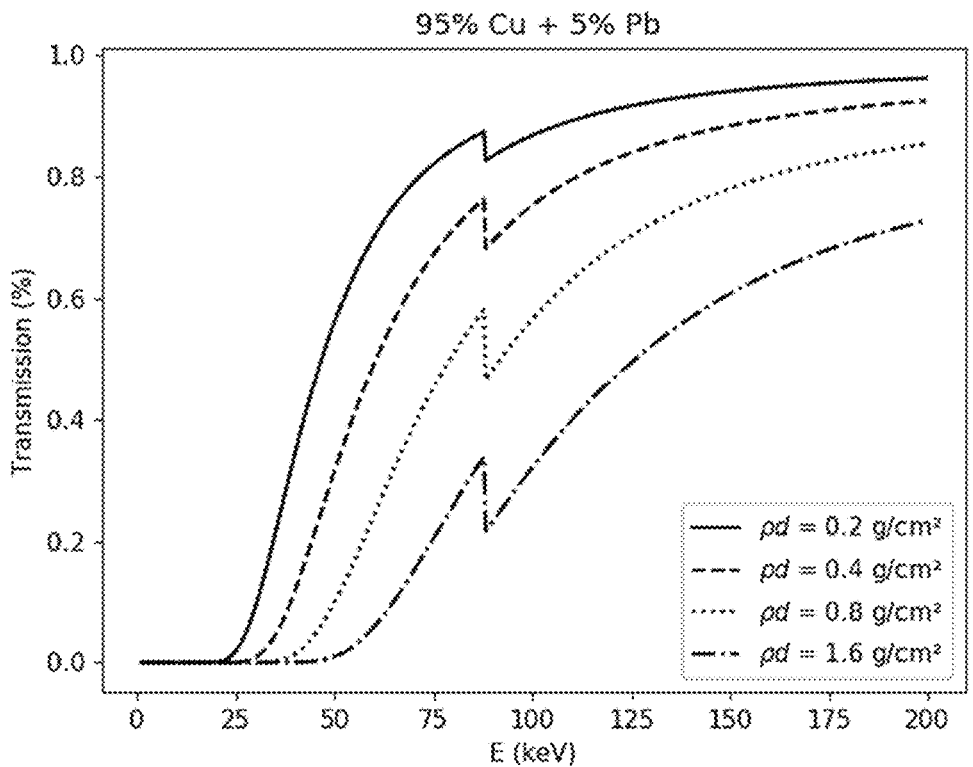

FIG. 10a, 10b show a schematic diagram of graphs relating to dual and multi-energy X-ray transmission. In the graphs, the transmission is plotted against the energy for different segmented objects 3i.

When (X-ray) photons pass through material, part of them interacts with the material, while another part does not. This last part, the transmitted part, is what the detector captures in X-Ray Transmission (XRT) imaging. The object to be imaged is located between source and detector.

The amount of transmitted X-rays by a certain material is dependent on 1) the material (chemical composition, atomic number), 2) the density (p), 3) the thickness (d) and 4) the energy of the photon (E).

This is reflected in FIG. 10a above where for different materials, the transmission of photons is plotted versus the x-ray photon energy. Thanks to the different spectral transmission of materials, we are able to distinguish between different materials, when we image materials using multiple energies.

For example, in the case of dual energy XRT (DE-XRT), each sensor pixel will be sensitive in two parts of the energy spectrum and therefore will generate a low and a high energy signal. The low energy signal integrates all the photons below a certain threshold, while the high energy signal integrates the x-ray with an energy above the threshold. By measuring the transmissions of a low and high part of the energy spectrum, it is possible to calculate the average atomic number (Z) and the area density (ρd) (density times thickness).

As can be seen in the figure the transmission spectra of certain materials show distinct drops (it also has peaks, but these are not drawn). The locations of these drops (the x-ray photon energy) are characteristic for the chemical elements, while the height of the drop corresponds to the amount of that material. Therefore by introducing multiple energy bins (more than two) and doing multi-energy x-ray transmission, it becomes possible to focus on certain or all of these drops and therefore quantitatively determine the chemical (elemental) composition of the scanned material by studying the location and the height of the drops.

Dual energy is able to measure the average atomic number, within a certain range (say up to an atomic number of 40). However multi-energy transmission can extend this range drastically to higher atomic numbers. Also, by focusing on specific drops multi-energy XRT enables to focus on specific chemical elements and quantitatively determine the amount of that element present in the material. One of the known techniques for this is K-edge imaging.

In FIG. 10b the effect of area density (ρd) (density times thickness) is depicted. The higher the density or the thicker the material the lower the transmission. The position of the drop however stays the same. The relative height of the drop is also very similar.

Figure 11A:
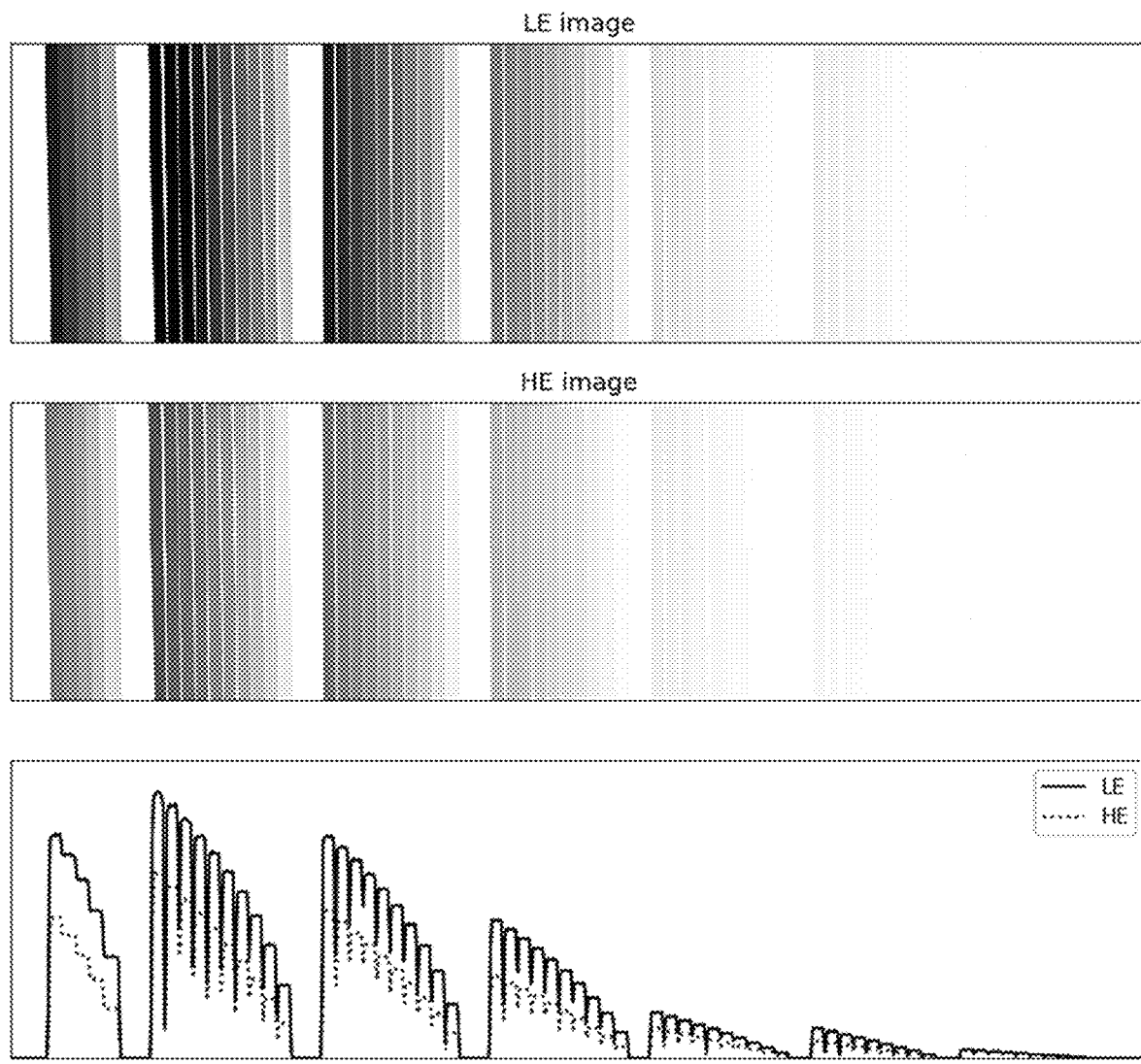
FIG. 11*a*, 11*b* show a schematic diagram of graphs.
Figure 11B:
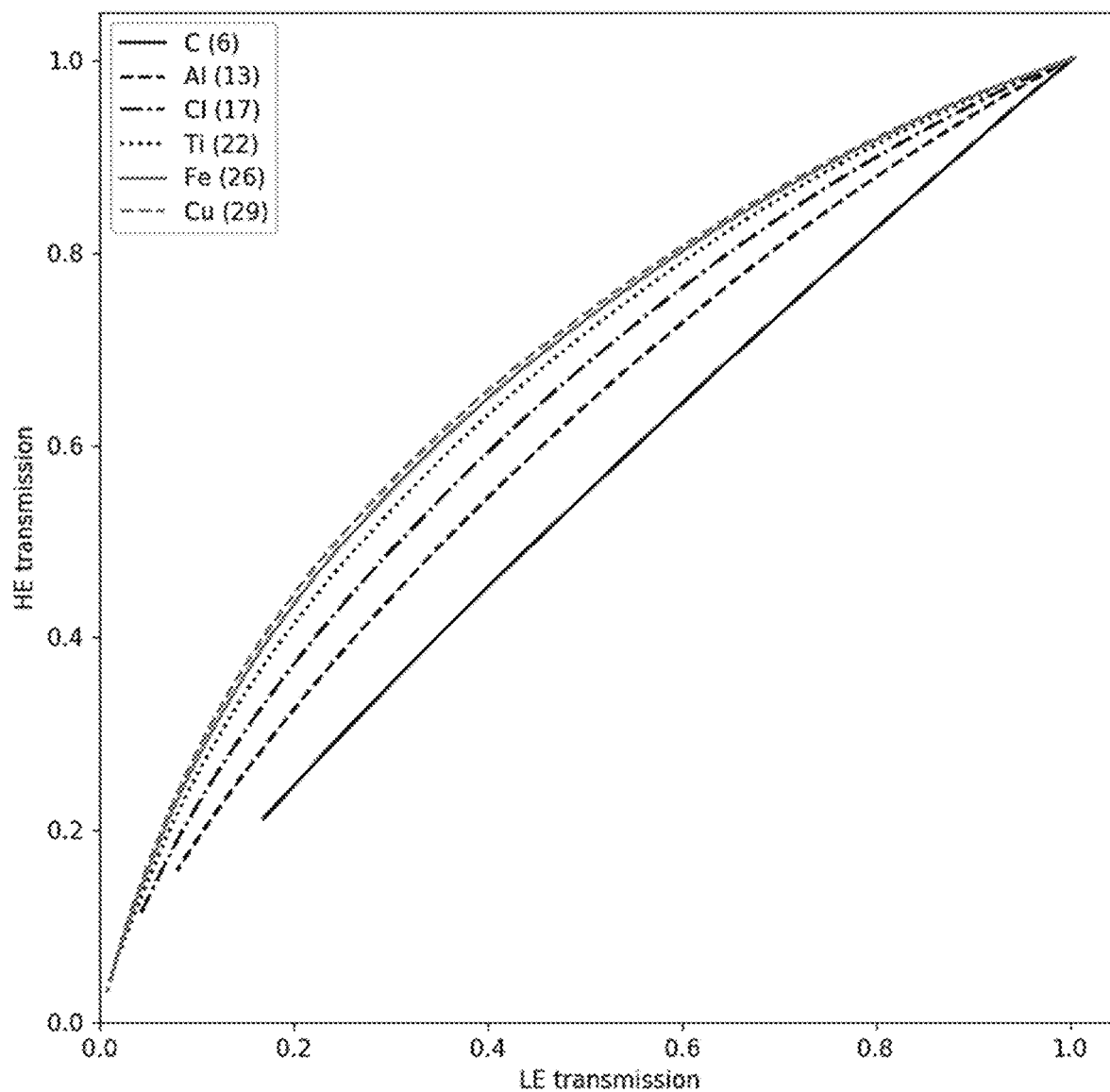

FIG. 11a, 11b show a schematic diagram of graphs relating to dual and multi-energy X-ray transmission. In FIG. 11a, a low-energy and high-energy image is shown. In FIG. 11b, the high energy transmission is plotted against the low energy transmission for different segmented objects 3i.

In FIG. 11a, one sees the influence of increasing Pb content. The location of the drop stays constant, but the height of the drop increases with increasing Pb content. This effect allows to quantitatively determine the chemical composition of a material using multi-energy imaging, e.g. k-edge imaging. Based on the DE-XRT calibration scan, the following relation between LE, HE and Z can be derived. Which allows to, based on measurement of LE and HE, derive the average atomic number, as illustrated in FIG. 11b. Similarly a relation with pd can be derived.

During calibration, materials may be taken whose atomic number and density of the materials are known. The graph shows for the low energy and high energy X-ray images what the atomic number and surface density is. If the area density is integrated or added over a segmented object, the mass of the object can be calculated.

Figure 12:
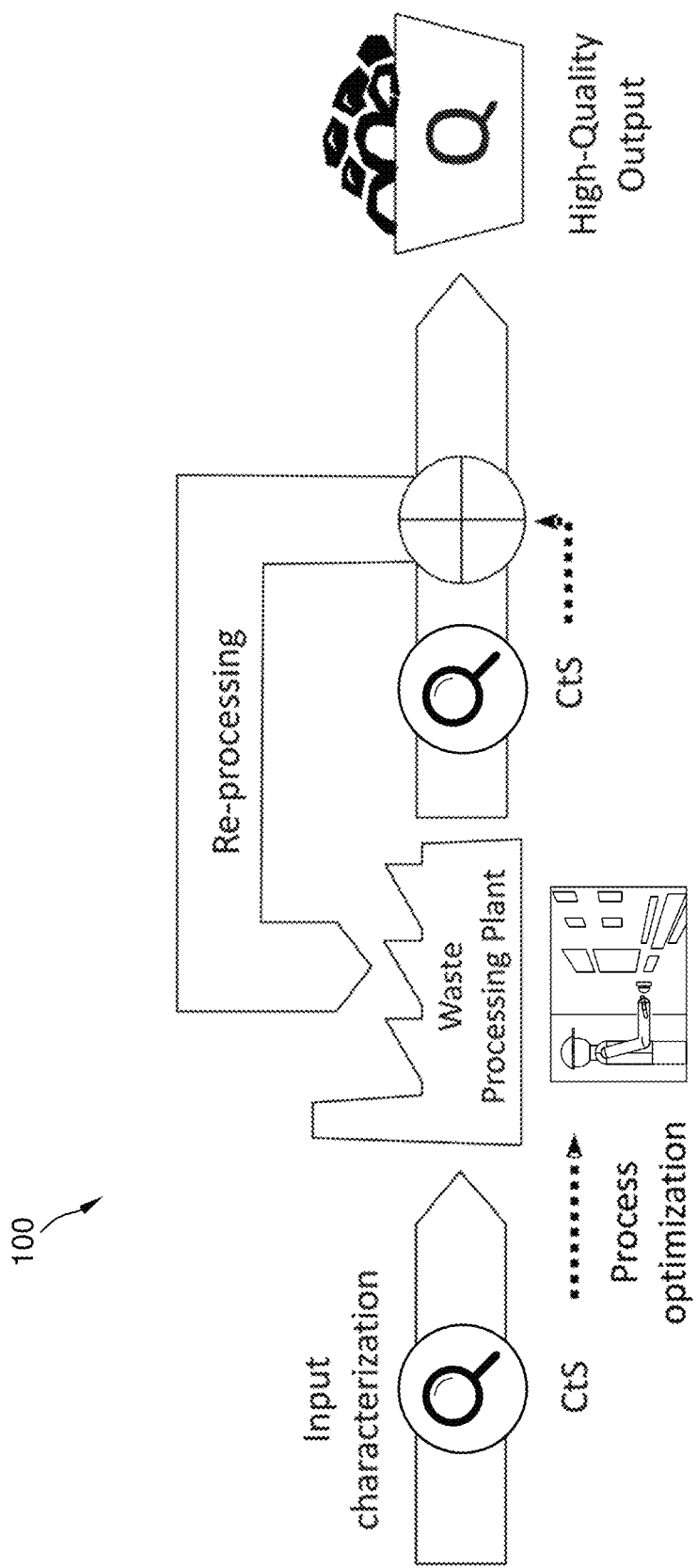
FIG. 12 shows a schematic diagram of an embodiment of a system.

FIG. 12 shows a schematic diagram of an embodiment of a system 100. The system 100 can be configured to control process parameters based on the information relating to the distinguished different materials in the waste stream. The system 100 can be configured to provide real-time process information for process control. If for example in a process, after the characterization step a dividing line is present, for example including a plurality of different physical separation steps. Then, on the basis of which input is coming, the parameters (e.g. speed bands, settings of machines) can be adjusted based on what is presented as input in order to achieve a better separation.

The invention may provide for a direct, inline characterization technology for bulk solid waste streams. The characterization can make use of different sensors (X-rays, 3D laser and color) and artificial intelligence to deliver big data on object/component level of the one or more materials (e.g. material stream) coupled to industrially relevant analytics.

Figure 13:
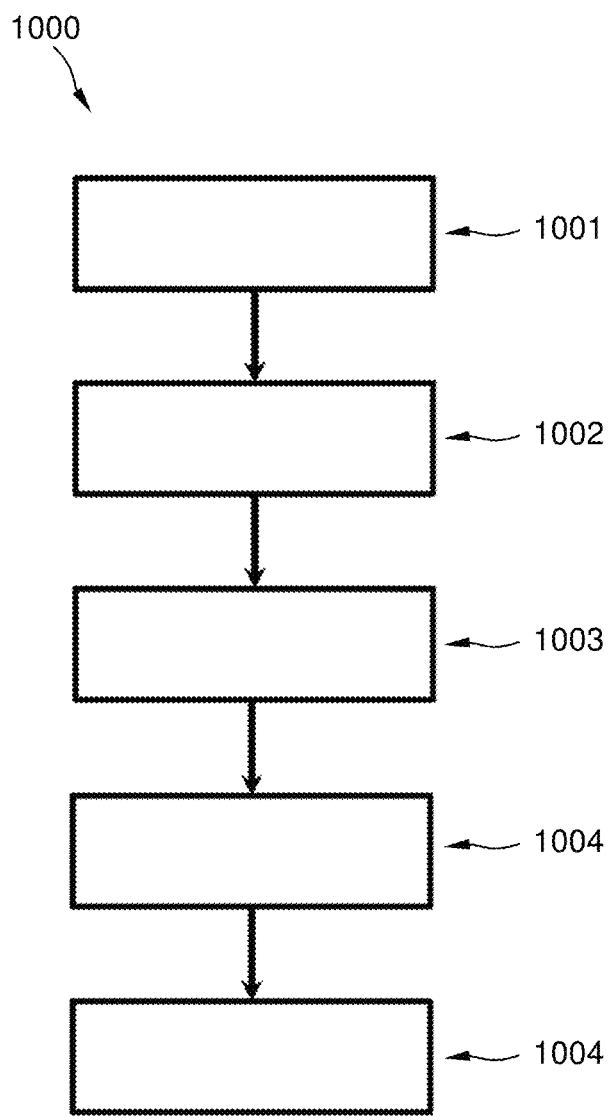
FIG. 13 shows a schematic diagram of a method.

FIG. 13 shows a schematic diagram of a method 1000 for performing characterization of one or more materials. In a first step 1001, the one or more materials are scanned by means of a sensory system including an X-ray sensor configured to perform multi-energy imaging for obtaining at least a lower-energy X-ray image and a higher-energy X-ray image. In a second step 1002, segmentation is performed of images obtained by means of the sensory system in order to separate one or more distinct objects in the images, wherein data indicative of an area of the segmented objects is determined. In a third step 1003, for each of the segmented objects, data indicative of an area density and data indicative of an atom number is determined by analysis of the lower-energy X-ray image and the higher-energy X-ray image, the data indicative of the area density and atom number being determined by means of a model which is calibrated by performing multi-energy X-ray imaging with different materials with known area densities and atom numbers. In a fourth step 1004, for each of the segmented objects, data indicative of a mass is calculated based on the data indicative of the area density and the data indicative of the area of each of the segmented objects. In a fifth step 1005, for each of the segmented objects, at least the data indicative of the atom number is provided as input to a trained neural network, wherein the trained neural network is configured to label each segmented object, wherein the data indicative of the mass is coupled to each of the labeled segmented objects.

Having knowledge regarding mass by using an X-ray imaging unit can bring sufficient advantages in material characterization. Such characterization may even be carried out on complex heterogeneous streams (e.g. application of sorting of waste material streams).

Various neural network models and/or neural network architectures can be used. A neural network has the ability to process, e.g. classify, sensor data and/or pre-processed data, cf. determined features characteristics of the segmented objects. A neural network can be implemented in a computerized system. Neural networks can serve as a framework for various machine learning algorithms for processing complex data inputs. Such neural network systems may "learn" to perform tasks by considering examples, generally without being programmed with any task-specific rules. A neural network can be based on a collection of connected units or nodes called neurons. Each connection, can transmit a signal from one neuron to another neuron in the neural network. A neuron that receives a signal can process it and then signal additional neurons connected to it (cf. activation). The output of each neuron is typically computed by some non-linear function of the sum of its inputs. The connections can have respective weights that adjust as learning proceeds. There may also be other parameters such as biases. Typically, the neurons are aggregated into layers. Different layers may perform different kinds of transformations on their inputs to form a deep neural network.

A deep learning neural network can be seen as a representation-learning method with a plurality of levels of representation, which can be obtained by composing simple but non-linear modules that each transform the representation at one level, starting with the raw input, into a representation at a higher, slightly more abstract level. The neural network may identify patterns which are difficult to see using conventional or classical methods. Hence, instead of writing custom code specific to a problem of printing the structure at certain printing conditions, the network can be trained to be able to handle different and/or changing structure printing conditions e.g. using a classification algorithm Training data may be fed to the neural network such that it can determine a classification logic for efficiently controlling the printing process.

It will be further understood that when a particular step of a method is referred to as subsequent to another step, it can directly follow said other step or one or more intermediate steps may be carried out before carrying out the particular step, unless specified otherwise. Likewise it will be understood that when a connection between components such as neurons of the neural network is described, this connection may be established directly or through intermediate components such as other neurons or logical operations, unless specified otherwise or excluded by the context.

It will be appreciated that the method may include computer implemented steps. All above mentioned steps can be computer implemented steps. Embodiments may comprise computer apparatus, wherein processes performed in computer apparatus. The invention also extends to computer programs, particularly computer programs on or in a carrier, adapted for putting the invention into practice. The program may be in the form of source or object code or in any other form suitable for use in the implementation of the processes according to the invention. The carrier may be any entity or device capable of carrying the program. For example, the carrier may comprise a storage medium, such as a ROM, for example a semiconductor ROM or hard disk. Further, the carrier may be a transmissible carrier such as an electrical or optical signal which may be conveyed via electrical or optical cable or by radio or other means, e.g. via the internet or cloud.

Some embodiments may be implemented, for example, using a machine or tangible computer-readable medium or article which may store an instruction or a set of instructions that, if executed by a machine, may cause the machine to perform a method and/or operations in accordance with the embodiments.

Various embodiments may be implemented using hardware elements, software elements, or a combination of both. Examples of hardware elements may include processors, microprocessors, circuits, application specific integrated circuits (ASIC), programmable logic devices (PLD), digital signal processors (DSP), field programmable gate array (FPGA), logic gates, registers, semiconductor device, microchips, chip sets, et cetera. Examples of software may include software components, programs, applications, computer programs, application programs, system programs, machine programs, operating system software, mobile apps, middleware, firmware, software modules, routines, subroutines, functions, computer implemented methods, procedures, software interfaces, application program interfaces (API), methods, instruction sets, computing code, computer code, et cetera.

The graphics and/or image/video processing techniques may be implemented in various hardware architectures. Graphics functionality may be integrated within a chipset. Alternatively, a discrete graphics processor may be used. For example, processing of images (still or video) may be performed by a graphics subsystem such as a graphics processing unit (GPU) or a visual processing unit (VPU). As still another embodiment, the graphics or image/video processing functions may be implemented by a general purpose processor, including e.g. a multi-core processor. In a further embodiment, the functions may be implemented in a consumer electronics device. Embodiments, using a combination of different hardware architectures are possible.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A computer implemented method of performing characterization of one or more materials, the method comprising:
scanning the one or more materials using a sensory system including an X-ray sensor configured to perform multi-energy imaging for obtaining at least a lower-energy X-ray image and a higher-energy X-ray image;
performing segmentation of images obtained using the sensory system in order to separate one or more distinct objects in the images, wherein data indicative of an area of the segmented objects is determined;
determining, for each of the segmented objects, data indicative of an area density and data indicative of an atom number by analysis of the lower-energy X-ray image and the higher-energy X-ray image, the data indicative of the area density and atom number being determined using a model which is calibrated by performing multi-energy X-ray imaging with different materials with known area densities and atom numbers;
calculating, for each of the segmented objects, data indicative of a mass based on the data indicative of the area density and the data indicative of the area of each of the segmented objects; and
providing, for each of the segmented objects, at least the data indicative of the atom number as input to a trained neural network, wherein the trained neural network is configured to label each segmented object, wherein the data indicative of the mass is coupled to each of the labeled segmented objects.

2. The method according to claim 1, wherein the calculated mass is provided as input to the trained neural network.

3. The method according to claim 1, wherein the sensory system further includes a depth imaging unit for determining data indicative of a volume of segmented objects.

4. The method according to claim 3, wherein the depth imaging unit includes at least one of a three-dimensional laser triangulation unit or three-dimensional camera.

5. The method according to claim 1, wherein the sensory system further includes a color imaging unit configured to take color images of the segmented objects.

6. The method according to claim 1, wherein data from different subsystems of the sensory system is aligned prior to determining characteristic features for each of the one or more segmented objects.

7. The method according to claim 1, wherein for each of the one or more segmented objects further characteristic features relating to at least one of a volume, dimension, diameter, shape, texture, color, or eccentricity, are determined.

8. The method according to claim 1, wherein the one or more materials are moved on a conveyor forming a material stream, wherein the material stream is scanned using the sensory system for characterization of objects in the material stream.

9. The method according to claim 1, wherein characteristic features of the one or more segmented objects are stored in order to build a digital twin model.

10. The method according to claim 1, wherein the one or more materials are characterized prior to transportation for determining a first digital identification marker, wherein subsequently after transportation to a remote location, the one or more materials are characterized for determining a second digital identification marker, wherein the first and second digital identification markers are compared with respect to each other in order to determine change of contents during transportation.

11. The method according to claim 1, wherein the one or more materials are non-homogeneous.

12. The method according to claim 1, wherein the one or more materials are selected from a group consisting of solid waste, produced products or components, agricultural products, or batteries.

13. A system for performing characterization of one or more materials, the system comprising:
a sensory unit arranged for scanning the one or more materials, the sensory unit including an X-ray sensor configured to perform multi-energy imaging for obtaining at least a lower-energy X-ray image and a higher-energy X-ray image;
wherein the system includes a controller configured to perform the steps of:
performing segmentation of images obtained using the sensory system in order to separate one or more distinct objects in the images, wherein data indicative of an area of the segmented objects is determined;
determining, for each of the segmented objects, data indicative of an area density and data indicative of an atom number by analysis of the lower-energy X-ray image and the higher-energy X-ray image, the data indicative of the area density and atom number being determined using a model which is calibrated by performing multi-energy X-ray imaging with different materials with known area densities and atom numbers;
calculating, for each of the segmented objects, data indicative of a mass based on the data indicative of the area density and the data indicative of the area of each of the segmented objects; and
providing, for each of the segmented objects, at least the data indicative of the atom number as input to a trained neural network, wherein the trained neural network is configured to label each segmented object, wherein the data indicative of the mass is coupled to each of the labeled segmented objects.

14. A computer program product comprising one or more non-transitory computer readable storage devices having program instructions stored thereon for causing a processor to perform the steps of the method according to claim 1.

15. A recycling device configured to sort a waste stream, wherein the recycling device includes the system according to claim 13 for distinguishing different materials in the waste stream.

16. The recycling device according to claim 15, wherein the device is configured to control process parameters based on the information relating to the distinguished different materials in the waste stream.

* * * * *